Dec. 10, 1935.  G. F. MILLER  2,024,009
BUMPER CONSTRUCTION
Filed Jan. 9, 1933
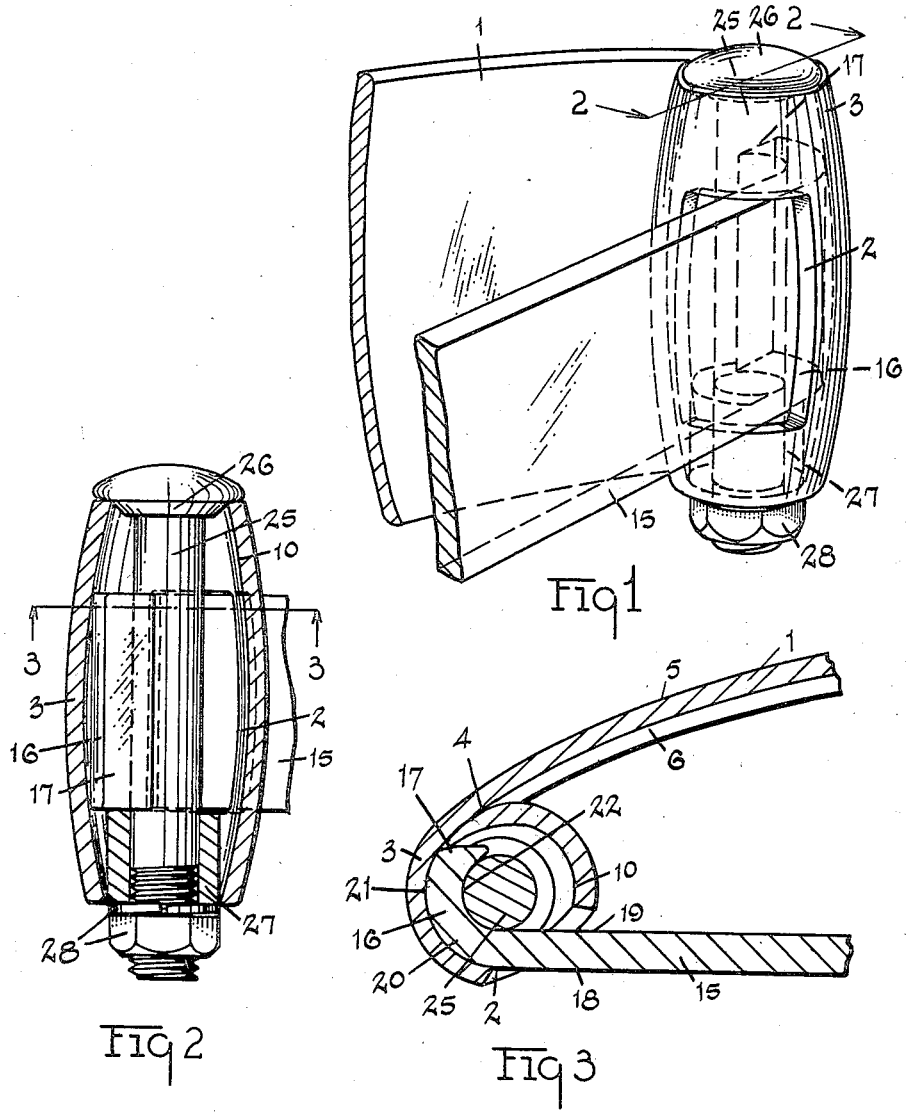
Inventor
George F. Miller
By Faust F. Crampton
Attorney Patented Dec. 10, 1935

2,024,009

UNITED STATES PATENT OFFICE 2,024,009

BUMPER CONSTRUCTION

George F. Miller, Toledo, Ohio, assignor, by mesne assignments, to The American Chain Company, Incorporated, New York, N. Y., a corporation of New York Application January 9, 1933, Serial No. 650,806

4 Claims. (Cl. 293—55)

My invention has for its object to provide a vehicle bumper construction wherein the impact receiving part is pivotally interjoined with the supporting or mounting part, that is connected to the vehicle, and is so constructed that the parts will frictionally, though yieldingly, resist flexure and vibration at the joint. The invention is particularly adaptable to bumper constructions for automobile vehicles, in that it provides a bumper of general stream line appearance and yet of marked utility and efficient performance.

The invention has for its object to provide a bumper construction having an impact receiving part and a mounting part flexibly and pivotally interjoined with one another, which may be quickly formed and assembled and will present an attractive appearance.

My invention has for another object to provide an impact receiving part interjoined with a mounting part whereby the impact receiving part may freely move angularly toward the mounting part about the interjointure but is increasingly locked against movement of the parts away from each other within definite limitations and thus provides a bumper construction of required resiliency for absorbing the shocks of impacts or collisions and, at the same time, provides an anti-rattling means continually operable during the use of the construction.

The invention has for its particular object to provide a joint construction between an impact receiving part and mounting part of a bumper formed to have end portions which are normally located in sliding frictional engagement with each other, and elements tending to increase the frictional engagement upon movement of the parts of the bumper relative to each other.

The invention consists in other features and advantages which will appear from the following description and upon examination of the drawing. To illustrate a practical application of the invention, I have selected a bumper construction embodying the invention as an example of the various structures and details thereof that contain the invention and shall describe the selected structure hereinafter, it being understood that variations may be made without departing from the spirit of the invention. The particular structure selected is shown in the accompanying drawing.

Fig. 1 of the accompanying drawing illustrates a perspective view of the bumper construction. Fig. 2 illustrates a view of a section taken on the plane of the line 2—2 indicated in Fig. 1. Fig. 3 illustrates a view of a section taken on the plane of the line 3—3 indicated in Fig. 2.

The bumper construction selected as an example of my invention has an impact bar and a supporting or back bar which are connected together at their ends. The impact bar is provided with cylindrical or barrel shaped end portions positioned to the rear of the ends of the body of the impact bar and each barrel shaped portion has an oblong rectangular shaped opening located on the side that opposes the other barrel shaped portion. The openings have dimensions that are as small as possible and yet enable the insertion of the ends of the back bar into the barrel shaped portions. The back bar has an over-all length slightly greater than the normal distance between the outer portions of the inside surfaces of the barrel shaped portions and consequently an overall length materially greater than the distance between outer edges of the opening of the barrel shaped portion of one end and the outer edges of the opening of the other barrel shaped portion at the other end of the impact bar. The outer and inner edges of the openings extend parallel to the axes of the barrel shaped portions and have a length substantially the same as the width of the end portions of the back bar. To locate the back bar in its assembled relation with respect to the impact bar, one end of the back bar is inserted through the opening of one of the barrel shaped portions and the other end of the back bar is placed against the other barrel shaped portion and pressed against the impact bar which causes the bars to spring and the outer end of the back bar to snap into the opening. This enables a rapid assembly of the bumpers and the parts being held together by the elasticity of the bars, it affords ready insertion of bolts and washers and nuts in the ends of the assembled bars.

The end edges of the bars are beveled and the end surfaces of the back bar are so formed as to coact against the end surfaces of the impact bar as to frictionally engage and yieldingly resist relative movements of the back bar and the impact bar to prevent vibration as well as to produce absorption of the deflecting pressure against the impact bar, that is, to absorb the shock of a collision or an impact.

As shown in the drawing, the impact bar 1 is provided with barrel shaped portions 3 and oblong rectangular shaped openings 2 are formed in the sides of the barrel shaped portions 3. The impact bar 1 is preferably convex on the forward side of the impact bar, that is, a transverse section is arcuate in shape, and, when the end portions are curvedly formed, they produce barrel shaped portions. The barrel shaped portions extend rearwardly from the ends of the body of the bar and consequently the openings 2 are located in the sides of the barrels that oppose each other and at points spaced from the end edges of the impact bar.

The end parts of the impact bar are beveled or feathered as at 4 and each edge extends substantially parallel to the axis of the barrel shaped portion. Intersection of the interior surfaces 10 of the barrel shaped end portions 3 by planes extending at right angles to the axes of the said end portions, form somewhat distorted ellipses by reason of the rolled in feathered portions 4 of the ends of the impact bar. The barrel shaped portions constitute a means for protection of the joint as against rust, etc., since it encloses the parts of the joint. It may be polished and finished and constitute a decorative feature of the car.

The mounting or back bar 15 may be provided with end portions 16 that are substantially the same as the width of the openings 2 measured in a direction parallel to the axes of the barrel shaped portions 3 of the impact bar. The end portion 16 of the impact bar 15 is beveled to form the surface 17 which extends diagonally across from one side surface to the other side surface of the back bar. The end portions 16 of the back bar are curved to form the hooked portion 20 having an outer curved surface 21 and an inner curved surface 22 that are joined at the ends by the surface 17 which is inclined to the direction of the surfaces 21 and 22 where the surfaces 17 meet the surfaces 21 and 22.

The surfaces 21 of the hooked portions 20 of the back bar are separated a distance that is preferably normally slightly greater than the distance between the outermost portions of the inner surfaces of the barrel shaped portions 3 of the impact bar and so that when the back bar is snapped into place, that is, when the hooked portions of the back bar have been forced into the openings 2 and into the barrel shaped portions 3 the resiliency of the two bars will cause the inner surfaces of the barrel shaped portions to engage the outer surfaces 21 of the hooks of the back bar. This operates to securely connect the bars together and will operate to hold the bars in their relationship even though the ends of the bars were provided with no other means for securing them. The bars will thus be held together to prevent rattling. Preferably, a bolt 25 is provided which extends through the barrel shaped portions 3 and the hooks 20. Also, preferably, the inner surface 22 of the hooks 20 is formed to fit the surface of the bolt. The bolt 25 has a lens shaped head 26 that draws into and seals the upper edge of the barrel shaped portion. A bushing 27 that substantially fits the lower edge of the barrel shaped portion, is located on the bolt. The bolt 25 is held substantially central with respect to the barrel shaped portion 3 by means of the head 26 and the bushing 27. A nut and washer 28 may be connected to the bolt 25 to clamp the parts together.

The end edge surface 17 of the back bar 15 is engaged by the end edge of the feathered portion 4 of the impact bar and the two wedgedly interengage. On the recoil when an impact occurs, the bars elastically yield, but an extreme return is frictionally resisted by the interwedging and interlocking of the end portions of the impact bar and the back bar. The parts operate to yieldingly interlock along the end edges of the bars. This prevents a distorted movement of one end of the impact bar. The interengagement between the edge portions prevents angular displacement by pressure on one end. In the majority of collisions only one end of the bumper is engaged. The resistance to separation of the other end of the impact bar from the back bar is resisted by the wedging action of the back bar and thus cooperates to withstand excess pressures occurring in a collision where but one end of the bumper is engaged. Slight relative movements of the bars about either bolt 25 in a direction away from each other tends to increasingly jam the surface 17 against the end edge of the bar 1. Thus the resistance to separation of the bars is resisted by frictional resistance that rapidly increases.

I claim:

1. In a bumper, an impact convex bar and a back supporting bar, the ends of the impact bar having return curved portions forming barrel shaped portions protruding rearwardly from the ends of the body of the impact bar, the side of each barrel shaped portion that opposes the other of the barrel shaped portions having a rectangular shaped opening located spaced from the end edge of the impact bar, the back bar having return curved portions forming hooks insertible through the openings, the hooks curving not more than 180° from the body of the back bar, bolts fitting the inner surfaces of the hooks of the back bar and edges of the ends of the barrel shaped portions of the impact bar.

2. In a bumper, an impact bar and a back supporting bar, the impact bar having feather end edges and the ends bent to form cylinders, the side of each cylinder having a rectangular shaped opening located a short distance from the end edge of the impact bar, the ends of the back bar having hooked portions insertible through the openings, the hooks having beveled ends, the surfaces of the beveled ends located in engaging relation with the surfaces of the feathered end edges of the impact bar for wedgedly engaging the inner surfaces of the cylinders at the end edges of the impact bar.

3. In a bumper, an impact bar and a back supporting bar, the impact bar having feather end edges and ends bent to form cylinders positioned to the rear of the ends of the body of the impact bar, the side of each cylinder having a rectangular shaped opening located a short distance from the end edge of the impact bar, the back bar having a length greater than the distance between the outer portions of the inside surfaces of the cylinders, the ends of the back bar having hook portions insertible through the openings, the hooks having bevelled ends, the surfaces of the bevelled ends located in engaging relation with the surfaces of the feathered end edges of the impact bar and wedgedly engaging the inner surfaces of the cylinders at the end edges of the impact bar.

4. In a bumper, an impact bar and a back supporting bar, the impact bar having feather end edges and ends bent to form cylinders, the side of each cylinder having a rectangular shaped opening located a short distance from the end edge of the impact bar, the outer and inner edges of the openings extending parallel to the axes of the cylinders and having a length substantially the same as the width of the end portions of the back bar, the back bar having a length slightly greater than the distance between the outer portions of the inside surfaces of the cylinders, the ends of the back bar having hook portions insertible through the openings, the hooks having bevelled ends, the surfaces of the bevelled ends located in engaging relation with the surfaces of the feathered end edges of the impact bar for wedgedly engaging the inner sufaces of the cylinders at the end edges of the impact bar.

GEORGE F. MILLER.